Aug. 4, 1953  S. K. MOOT  2,647,967
LOW TIRE INDICATOR SWITCH
Filed March 26, 1951

S. K. Moot
INVENTOR,
BY *C. A. Snow & Co.*
ATTORNEYS.

Patented Aug. 4, 1953

2,647,967

UNITED STATES PATENT OFFICE 2,647,967

LOW TIRE INDICATOR SWITCH

Samuel K. Moot, Pampa, Tex.

Application March 26, 1951, Serial No. 217,444

2 Claims. (Cl. 200—58)

This invention relates to a device mountable upon a vehicle adjacent any wheel thereof, and adapted to signal a low condition of inflation of a pneumatic tire mounted upon said wheel.

An important object of the present invention is to provide a low tire indicator switch as described capable of being mounted in the desired location speedily and easily.

Another important object is to provide a low tire indicator switch novelly designed for closing a circuit to a signal means of either the audible or visible type, with said circuit to be closed responsive to pressure exerted upon a feeler member either upwardly, forwardly, or rearwardly.

Still another important object is to provide a switch of the character described which can be manfactured at relatively low cost, and which will be rugged and trouble free.

Yet another object is to provide a low tire indicator switch as described so designed as to permit the mounting of a number of the switches on a single vehicle, one adjacent each wheel with the several switches being capable of being placed in circuit with one or more signal devices disposed in the vehicle interior.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
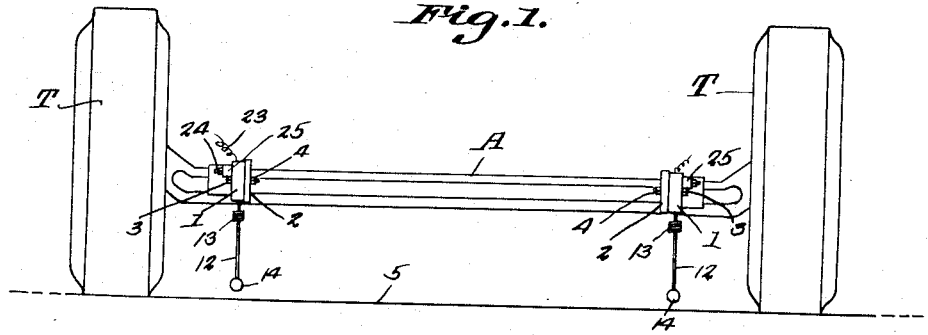
Fig. 1 is a front elevational view of an axle and wheel assembly of a vehicle, two of the switches being mounted thereon.

Referring to the drawings in detail, the switch includes a box-like, rectangular case 1 one side of which is formed open and is closed by a removable cover 2. A connecting bolt 3 disposed centrally of the case extends through registering openings in the case and cover, and has nuts 4 for securing the cover to the case.

The connecting bolt 3 also constitutes a pivot on which is swingably mounted a hinge block 5, washers 6 and 7 being disposed on the bolt at opposite sides of the block to assure free swinging movement of the block.

The block has an inclined slot 8 receiving the bolt 3, the bolt being normally positioned at the upper end of the slot. The slot 8 is located medially between opposite ends of the block. In that end of the block nearest the upper end of the slot is formed a vertical bore 9 receiving the medial portion of a feeler member 10 formed from a length of stout spring wire. The feeler member is made rigid with the block by solder or equivalent means.

Immediately below the hinge block 5, the feeler member is offset as at 11 in the direction of the other end of the hinge block, the offset portion 11 merging into a vertical lower end portion 12 projecting through the bottom wall of the case a substantial distance. The lower end portion 12 is preferably provided with a plurality of spring coils 13 to increase its flexibility, and at its lower end is provided with a ball 14 adapted to contact a supporting surface S when for some reason a tire T mounted upon an axle A becomes deflated to an undesirable extent.

The upper end portion of the feeler member 10 projects above the hinge block 5 and is offset as at 15 in a direction opposite to that of the offset 11. At the upper end of the feeler member a lateral contact shoe 16 is formed thereon for the purpose of closing a circuit through a signal means, not shown, in a manner which will be described in detail hereinafter.

In the upper end of the case 1 I provide means contacted by the feeler member whenever pressure is exerted against the lower end of the feeler member either upwardly, forwardly, or rearwardly of the vehicle on which the device is mounted, said means when engaged by the feeler member being adapted to close a circuit to a signal device within the vehicle interior.

To this end, I provide a mounting plate 17 extending downwardly from the upper end wall of the case, the mounting plate 17 being made rigid with the case in any suitable manner.

Covering one face of the mounting plate 17 is an insulation washer 18 formed to an outer configuration corresponding to that of the plate 17. Insulation is also used to cover the opposite face of the mounting plate 17, as well as adjacent portions of the case, to prevent the plate or case from being accidentally engaged by an electrically conductive contact plate 20. In this connection, the insulation member 19 is integrally formed to include not only an end portion overlying the mounting plate 17, but also a top portion 28 underlying the top end wall of the case, and a side portion 29 positioned against the inner wall of the case.

Seated against the insulation member 19, and insulated thereby from the mounting plate and case, is an electrically conductive contact plate 20, one end wall of which is positioned against the end portion of the insulation member. The contact plate has an inner wall positioned against the wall 29 of the insulation member, and a top wall positioned against the wall 28 of said insulation member. The top wall of the contact plate is extended downwardly to include a depending finger 21. Thus, it will be seen that the contact shoe 16 of the feeler member underlies and is spaced from the top wall of the contact plate, and is disposed between and is normally spaced from the end wall and finger of said contact plate.

For the purpose of holding the mounting plate, insulation members, and contact plate assembled, and also for the purpose of providing a terminal on the contact plate, I extend through registering openings formed in these parts a screw 22, to which is secured a lead 23 extending to a signal device which will be positioned within the vehicle interior, and which is not shown in the present instance.

It will be understood that the lead 23 is placed in circuit with the battery of the vehicle, and also preferably with the ignition switch, and with a separate manually operated switch if desired.

The device is mounted in the desired position, by means of bolts 24 whereby the case is secured to a bracket 25 mounted upon the axle A or other portion of the vehicle.

Secured at one end to the lower portion of the hinge block 5, at that end of the hinge block that carries the feeler member 10, is a spring 26, the other end of which is connected to one of the lower corners of the case. A slot 27 is formed in the lower end of the case, through which the lower end portion 12 of the feeler member projects.

Figure 2:
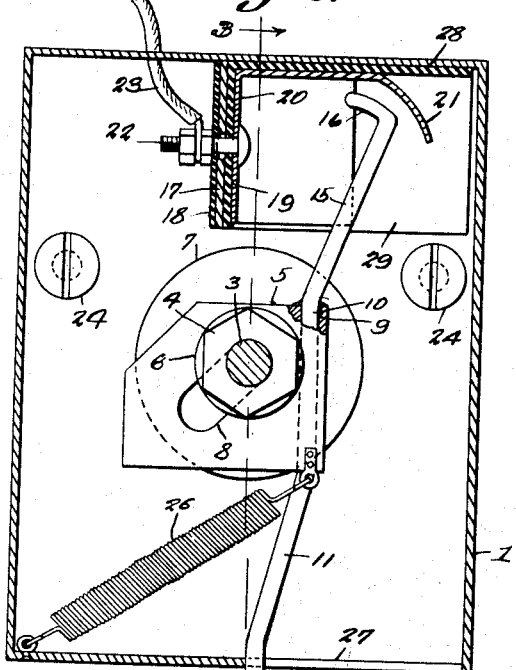
Fig. 2 is a longitudinal section through one of the switches.
Figure 3:
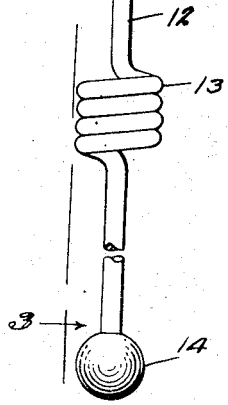
Fig. 3 is a transverse section taken substantially on line 3—3 of Fig. 2.
Figure 3:
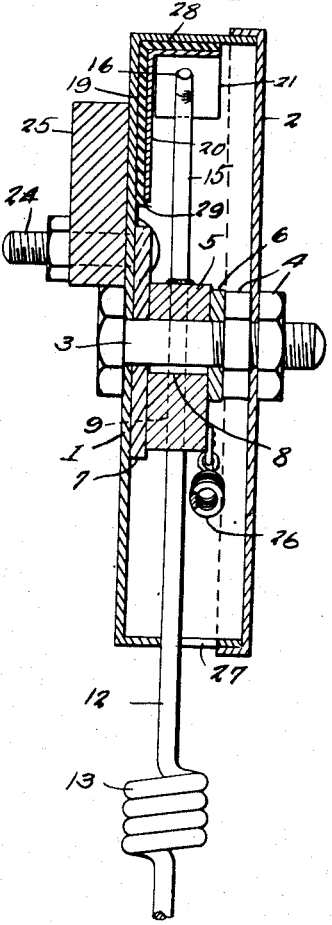

The spring 26 normally pulls the feeler member against the left hand end of the slot when viewed as in Fig. 2, the spring at the same time exerting a downward pull to retain the pivot bolt 3 in the upper end of the slot 8 of the hinge block.

Should a tire T become deflated either wholly or partially, the ball 14 will be engaged by the supporting surface S, and will urge the feeler member upwardly, causing the hinge block to ride upwardly and forwardly upon the pivot bolt 3, as a result of which the contact shoe 16 of the feeler member will be brought into contact with the finger 21 or with the top wall of the contact plate. As a result, a circuit will be closed through the signal means mentioned above, said circuit being closed through the feeler member to ground.

If pressure is applied to the lower end of the feeler member tending to swing the ball 14 to the right in Fig. 2, the hinge block will pivot on the bolt 3, swinging the contact shoe 16 against the vertical end wall of the contact plate, and again a circuit will be closed. If pressure is exerted tending to swing the ball 14 to the left in Fig. 2, the feeler member will in effect pivot on the left hand end of the slot 27, causing the hinge block 5 to ride upwardly and to the right upon the pivot bolt 3, again bringing the contact shoe into contact with the finger 21.

It is preferred that the pivot bolt 3 be welded to the case 1.

What is claimed is:

1. A switch for closing a circuit through a device for indicating the deflated condition of a vehicle tire, said switch comprising a horizontally extending bolt mounted adjacent a tire, a block mounted on the bolt to rotate about the axis thereof and to move in an upwardly inclined path, an elongated feeler member mounted intermediate its ends on the block for movement therewith, a retractile coiled spring fixed at one end below the block and connected at its opposite end to the block for yieldingly holding the block down and against rotation, a curved contact member carried above the bolt in eccentric relation thereto, and said contact member lying in the path of movement of the feeler member for engagement thereby when the block moves upwardly or rotates against the effort of the spring.

2. A switch for closing a circuit through a device for indicating the deflated condition of a vehicle tire, said switch comprising a horizontally extending bolt mounted adjacent a tire, a block mounted on the bolt to rotate about the axis thereof and to move in an upwardly inclined path, an elongated feeler member mounted intermediate its ends on the block for movement therewith, a retractile coiled spring fixed at one end below the block and connected at its opposite end to the block for yieldingly holding the block down and against rotation, a curved contact member carried above the bolt in eccentric relation thereto, and said contact member lying in the path of movement of the feeler member for engagement thereby when the block moves upwardly or rotates against the effort of the spring, and a stop carried below the bolt and in the path of movement of the feeler member for arresting movement of the feeler member under the influence of the spring.

SAMUEL K. MOOT.

References Cited in the file of this patent

FOREIGN PATENTS

| Number | Country | Date |
|---|---|---|
| 451,666 | France | Dec. 10, 1912 |
| 36,239 | France | Sept. 25, 1928 |
| | (1st addition to #673,313) | |
| 36,701 | France | Sept. 29, 1928 |
| | (2nd addition to #673,313) | |